(12) United States Patent
Redert et al.

(10) Patent No.: US 8,648,792 B2
(45) Date of Patent: Feb. 11, 2014

(54) AUTOSTEREOSCOPIC DISPLAY DEVICE

(75) Inventors: Peter-Andre Redert, Eindhoven (NL); Marcellinus Petrus Carolus Michael Krijn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 565 days.

(21) Appl. No.: 12/739,420

(22) PCT Filed: Oct. 27, 2008

(86) PCT No.: PCT/IB2008/054420
§ 371 (c)(1),
(2), (4) Date: Apr. 23, 2010

(87) PCT Pub. No.: WO2009/057030
PCT Pub. Date: May 7, 2009

(65) Prior Publication Data
US 2010/0245406 A1    Sep. 30, 2010

(30) Foreign Application Priority Data

Nov. 2, 2007  (EP) .................................... 07119846

(51) Int. Cl.
*G09G 3/36* (2006.01)
*G09G 3/00* (2006.01)
*G09G 5/10* (2006.01)
*G02B 27/22* (2006.01)
*H04N 13/04* (2006.01)

(52) U.S. Cl.
USPC ................. 345/102; 345/4; 345/30; 345/690; 359/463; 348/51

(58) Field of Classification Search
USPC ....................... 345/690; 348/59, 51
See application file for complete search history.

(56) References Cited

U.S. PATENT DOCUMENTS

| | | | | |
|---|---|---|---|---|
| 4,717,949 A | * | 1/1988 | Eichenlaub | 348/54 |
| 5,410,345 A | * | 4/1995 | Eichenlaub | 348/59 |
| 5,461,495 A | * | 10/1995 | Steenblik et al. | 359/463 |
| 5,852,512 A | * | 12/1998 | Chikazawa | 359/463 |

(Continued)

FOREIGN PATENT DOCUMENTS

| | | | |
|---|---|---|---|
| GB | 2196166 A | 4/1988 | |
| GB | 2337388 A | 11/1999 | |
| WO | 2005071474 A2 | 8/2005 | |
| WO | 2005071976 A1 | 8/2005 | |
| WO | 2007072330 A1 | 6/2007 | |
| WO | WO 2007072330 * | 6/2007 | ............. H04N 13/00 |
| WO | 2008032943 A1 | 3/2008 | |

*Primary Examiner* — Bipin Shalwala
*Assistant Examiner* — Benyam Ketema

(57) ABSTRACT

A multi-view autostereoscopic display device comprises: a backlight having a plurality of backlight areas arranged in a width direction of the display device; a spatial light modulator arranged over and in registration with the backlight, the spatial light modulator having an array of display forming elements arranged in rows and columns for modulating light received from the backlight; and a view forming layer arranged over and in registration with the spatial light modulator, the view forming layer having a plurality of view forming elements arranged in the width direction of the display device, each view forming element being configured to focus modulated light from adjacent groups of the display forming elements into a plurality of views for projection towards a user in different directions. The backlight is switchable to activate different ones of the backlight areas in different portions of a driving cycle of the display device so that, in the different portions of the driving cycle, modulated light from the active backlight areas is incident on each view forming element with respective different angles of incidence. In this way, the overall viewing angle or the effective three dimensional display resolution may be increased.

10 Claims, 8 Drawing Sheets

(56) References Cited

U.S. PATENT DOCUMENTS

| | | | |
|---|---|---|---|
| 6,061,179 A * | 5/2000 | Inoguchi et al. | 359/464 |
| 6,064,424 A | 5/2000 | Van Berkel et al. | |
| 7,436,594 B2 * | 10/2008 | Van Berkel et al. | 359/462 |
| 7,580,186 B2 * | 8/2009 | Mather et al. | 359/463 |
| 2005/0057702 A1 * | 3/2005 | Cho et al. | 349/15 |
| 2007/0008406 A1 * | 1/2007 | Shestak et al. | 348/58 |
| 2007/0258140 A1 * | 11/2007 | Shestak et al. | 359/465 |
| 2008/0068329 A1 * | 3/2008 | Shestak et al. | 345/102 |
| 2008/0259233 A1 * | 10/2008 | Krijn et al. | 349/15 |

* cited by examiner

AUTOSTEREOSCOPIC DISPLAY DEVICE

FIELD OF THE INVENTION

This invention relates to an autostereoscopic display device comprising an image forming means, such as a display panel having an array of display pixels, and a view forming means through which the display pixels are viewed. The invention also relates to a method of driving an autostereoscopic display device and a computer programmed product.

BACKGROUND OF THE INVENTION

GB 2196166 A discloses an autostereoscopic display device that comprises a two dimensional liquid crystal display panel having a row and column array of display pixels acting as an image forming element to produce the display. An array of lenticular elements extending parallel to one another overlies the display pixel array and acts as a view forming element. The display pixels are observed through these lenticular elements.

The lenticular elements are provided as a sheet of elements, each of which comprises an elongate semi-cylindrical lens element. The lenticular elements extend in the column direction of the display panel, with each lenticular element overlying a respective group of two or more adjacent columns of display pixels.

In an arrangement in which, for example, each lenticule is associated with two columns of display pixels, the display pixels in each column provide a vertical slice of a respective two dimensional sub-image. The lenticular sheet directs these two slices and corresponding slices from the display pixel columns associated with the other lenticules, to the left and right eyes of a user positioned in front of the sheet, so that the user observes a single stereoscopic image.

In other arrangements, each lenticule is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are perceived creating, for example, a look-around impression. The above described device provides an effective three dimensional display. However, it will be appreciated that, in order to provide stereoscopic views, there is a necessary sacrifice in the horizontal resolution of the device causing a substantial difference between vertical and horizontal resolution in autostereoscopic mode.

It will also be appreciated that there is a trade off between the viewing angle of the display and the perception of three dimensional depth in the display. In particular, to provide a display having a wide viewing angle, it is necessary to distribute the projected views over a large angle, for example 60°. However, such a display provides a shallow three dimensional image with little perception of depth. In contrast, in order to provide a realistic three dimensional image with good depth, it is necessary to concentrate all of the projected views across a small viewing angle.

Consequently, using known techniques, it is difficult to provide a display having a good image resolution, a wide viewing angle and a good perception of depth.

SUMMARY OF THE INVENTION

It is an object of the invention to provide an improved autostereoscopic display device.

The invention is defined by the independent claims. The dependent claims define advantageous embodiments.

According to an aspect of the invention, there is provided an autostereoscopic display device comprising:

a backlight (107; 207; 307) having a plurality of backlight areas arranged in a width direction of the autostereoscopic display device;

a spatial light modulator (103) arranged over and in registration with the backlight (107; 207; 307), the spatial light modulator (103) having an array of display forming elements arranged in rows and columns for modulating light received from the backlight; and a view forming layer (109) arranged over and in registration with the spatial light modulator (103), the view forming layer (109) having a plurality of view forming elements arranged in the width direction of the display device, each view forming element being configured to direct modulated light from groups of the display forming elements into a plurality of views towards a user, wherein the backlight (107; 207; 307) is switchable to activate different ones of the backlight areas in different portions of a driving cycle of the display device so that, in the different portions of the driving cycle, modulated light from the active backlight areas is incident on each view forming element with respective different angles of incidence.

In use of the device, light from each of the backlight areas is modulated by the spatial light modulator and is incident on each of the view forming elements in a narrow angular range. Thus, when the backlight is driven to sequentially activate different ones of the backlight areas, the view forming elements are sequentially provided with modulated light having different angles of incidence.

In synchronization with the driving of the backlight, the spatial light modulator is sequentially driven with display data. For example, the spatial light modulator may be sequentially driven with display data for different pluralities of views. The light from the spatial light modulator is incident on each of the view forming elements with sequentially changing angular distributions and, in this case, the different pluralities of views are projected towards the user in different horizontal directions. Both the total number of views and the useful viewing angle provided by a display device may be increased in this way.

In other embodiments, the spatial light modulator may be sequentially driven with display data for different elements of the same plurality of views. In this case, the effective resolution of each of the views may be increased.

The backlight areas may define a plurality of spaced apart parallel bands, a length direction of the bands extending from a top edge to a bottom edge of the backlight. The spacing between the backlight areas may be greater than their width.

The backlight may comprise a plurality of light emitting diodes arranged in the backlight areas. In other embodiments, the backlight may comprise a plurality of elongate light sources arranged in the backlight areas. Light diffusion elements may be provided in the backlight areas.

In some embodiments, the backlight may comprise an opaque mask, the mask being patterned in the backlight areas to allow for the transmission of light. This allows to adopt regular or known backlights with for example a uniform illumination area such that they emit light according to the backlight areas for use in the invention, in a simple and cost effective way using known masking techniques.

The array of view forming elements may comprises an array of lenticular elements or lenses or a barrier layer having an array of light-transmissive slits formed therein. Other parallax generating view forming elements can also be used without loss of advantage. The spatial light modulator may comprise a transmissive liquid crystal display panel. The display forming elements may be arranged in rows and columns, and the arrangement may be orthogonal.

In the different portions of the driving cycle, light incident on each display forming element from a closest active backlight area may be projected towards different ones of the view forming elements. Such an arrangement may provide for an increase in the number of views and in the overall viewing angle of the display device.

The device may further comprise a display driver arranged to drive the backlight and the spatial light modulator. The display driver may be arranged to, in the different portions of the driving cycle, drive the spatial light modulator with information for different pluralities of views.

Alternatively, in the different portions of the driving cycle, light incident on each display forming element from a closest active backlight area may be projected towards different portions of the same view forming element. Such an arrangement provides for an increase in the effective resolution of each of the views provided by the display device.

In this case, the device may further comprise a display driver arranged to drive the backlight and the spatial light modulator, wherein, the display driver is arranged to, in the different portions of the driving cycle, drive the spatial light modulator with information for different elements of a same plurality of views, to thereby increase the effective resolution of each of the views provided by the display device.

In embodiments in which the spatial light modulator is sequentially driven with display data for different pluralities of views, the backlight and the spatial light modulator may be arranged such that:

$$\frac{w_{light}}{p_{light}} \leq \tan\varphi_{view} \text{ and } \frac{w_{light}}{d_{light}} \leq \tan\varphi_{view}$$

where $w_{light}$ is the width of each backlight area, $p_{light}$ is the pitch between backlight areas, $d_{light}$ is the distance between the planes of the backlight and the spatial light modulator, and $\varphi_{view}$ is the viewing angle of each of the views to be formed by the view forming layer. Such an arrangement provides each of the view forming elements with light having sufficiently distinct angles of incidence.

In certain of these embodiments, the backlight and the spatial light modulator may also be arranged such that:

$$\frac{p_{light}}{d_{light}} \leq \tan\varphi_{zone}$$

where $\varphi_{zone}$ is the combined viewing angle of the plurality of views to be formed by the view forming layer at any one time, i.e. the product of N and $\varphi_{view}$, where N is the number of views in each of the pluralities of views to be formed by the view forming layer. For example, the backlight and the spatial light modulator may be arranged such that:

$$\frac{p_{light}}{d_{light}} = \frac{N-1}{N}\tan\varphi_{zone}$$

Such arrangements can be configured to avoid or minimize crosstalk between the outer views of each of the pluralities of views.

In embodiments, the backlight may be defined by a first number of virtual backlight areas separated from the spatial light modulator by a first distance. These virtual backlight areas may be defined by a second number of real backlight areas separated from the spatial light modulator by a second distance and an array of lenticular lenses. The first number may be greater than the second number and the first distance may be less than the second distance. Such an arrangement may be used to provide a thinner display device by an overall reduction in the distance between the backlight areas and the plane of the spatial light modulator.

According to another aspect of the invention, there is provided a method of driving an autostereoscopic display device according to the invention.

According to another aspect of the invention, there is provided a method of driving an autostereoscopic display device as claimed in claim 1, the method comprising:

in a first portion of the driving cycle, switching the backlight areas to provide a first spatial light distribution and simultaneously driving the spatial light modulator with information for a first plurality of elements for a plurality of views; and in a second portion of the driving cycle, switching the backlight areas to provide a second spatial light distribution, different from the first spatial light distribution, and simultaneously driving the spatial light modulator with information for a second plurality of elements, different from the first plurality of elements, for the plurality of views.

In the above methods, the first and second spatial light distributions may be defined by mutually exclusive sets of active backlight areas.

The invention also provides a computer program, which may be embodied on a computer readable medium or in a chip, and a display driver adapted to perform the above methods. The program may be a display driver. The invention provides a computer program product in the form of for example a display driver, which product enables a programmable device to carry out the methods according to the invention.

The medium or chip may be an integrated circuit or electronic device made according to standard semiconductor design and methods of manufacturing or standard electronic engineering techniques and methods of manufacturing. It may be an analog or digital chip.

U.S. Pat. No. 6,064,424 discloses an autostereoscopic display device similar to that described above, except that the elongate lenticular elements are slanted at an angle to the column direction of the display panel. By slanting the lenticular elements, some of the reduction in horizontal resolution, which would otherwise be required, is transferred to the vertical resolution. It thus becomes possible to "consume" both vertical and horizontal resolution to increase the number of views displayed by the device. Nevertheless, it is still necessary to sacrifice resolution to obtain a display having a wide viewing angle and/or a good perception of depth.

BRIEF DESCRIPTION OF THE DRAWINGS

Embodiments of the invention will now be described, purely by way of example, with reference to the accompanying drawings, in which.

DETAILED DESCRIPTION OF EMBODIMENTS

The invention provides an autostereoscopic display device of the type that has a backlight, a spatial light modulator and a view forming layer. The spatial light modulator is sequentially driven with display information for different pluralities of views or different elements of the same plurality of views. Simultaneously, the backlight is driven to provide view forming elements of the view forming layer with modulated light having sequentially changing angles of incidence. These changing angles of incidence cause the different pluralities of views or the different elements of the same plurality of views to be projected towards to user to provide an increased number of views or views having an increased resolution.

Figure 1:
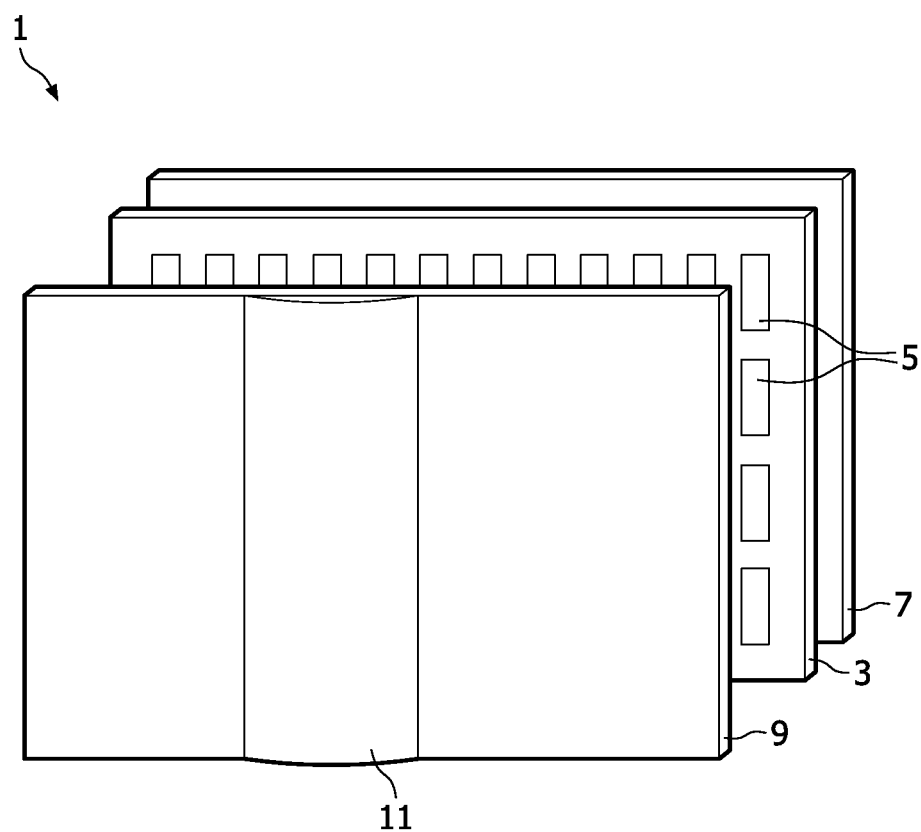
FIG. 1 is a schematic perspective views showing the operation of a known autostereoscopic display device.

FIG. 1 is a schematic perspective view of a known multi-view autostereoscopic display device 1. The known device 1 comprises a liquid crystal display panel 3 of the active matrix type that acts as a spatial light modulator to produce the display.

The display panel 3 has an orthogonal array of display forming elements or pixels 5 arranged in rows and columns. For the sake of clarity, only a small number of display pixels 5 are shown in the Fig. In practice, the display panel 3 might comprise about one thousand rows and several thousand columns of display pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarizing layers are also provided on the outer surfaces of the substrates.

Each display pixel 5 comprises opposing electrodes on the substrates, with the intervening liquid crystal material there between. The shape and layout of the display pixels 5 are determined by the shape and layout of the electrodes. The display pixels 5 are regularly spaced from one another by gaps.

Each display pixel 5 is associated with a switching element, such as a thin film transistor (TFT) or thin film diode (TFD). The display pixels are operated to produce the display by providing addressing signals to the switching elements, and suitable addressing schemes will be known to those skilled in the art.

The display panel 3 is illuminated by a planar, diffuse backlight 7 extending over the area of the display pixel array. Light from the backlight 7 is directed through the display panel 3, with the individual display pixels 5 being driven to modulate the light and produce the display.

The display device 1 also comprises a view forming layer 9, arranged over the display side of the display panel 3, which performs a view forming function. The view forming layer 9 comprises a row of lenticular elements 11 extending parallel to one another, of which only one is shown with exaggerated dimensions for the sake of clarity. The lenticular elements 11 act as view forming elements to perform a view forming function.

The lenticular elements 11 are in the form of convex cylindrical lenses, and they act as a light output directing means to provide different images, or views, from the display panel 3 to the eyes of a user positioned in front of the display device 1. The cylindrical surfaces of the lenticular elements 11 shown in FIG. 1 face away from the display panel 3. However, in other arrangements, the cylindrical surfaces of the lenticular elements 11 may face towards the display panel 3. The autostereoscopic display device 1 shown in FIG. 1 is capable of providing several different perspective views in different directions. In particular, each lenticular element 11 overlies a small group of display pixels 5 in each row. The lenticular element 11 projects each display pixel 5 of a group in a different direction, so as to form the several different views. As the user's head moves from left to right, his/her eyes will receive different ones of the several views, in turn.

Figure 2:
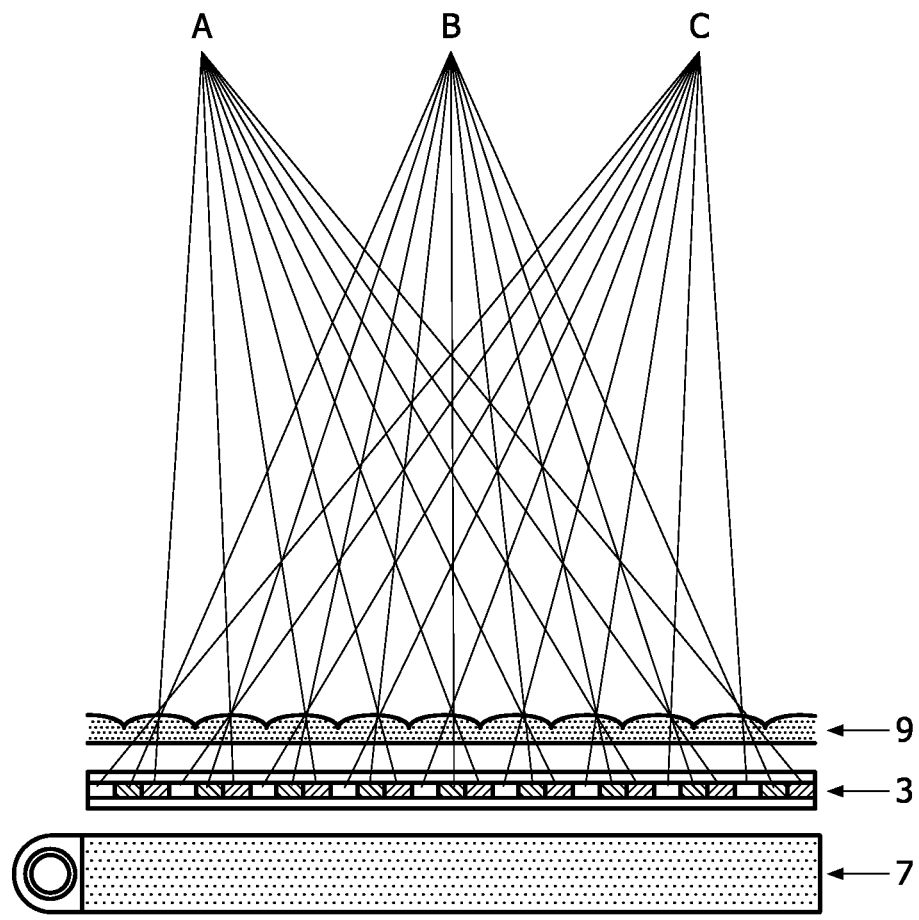
FIG. 2 is a schematic plan view of the display device shown in FIG. 1.

FIG. 2 shows the principle of operation of a lenticular type imaging arrangement as described above and shows the light source 7, display panel 3 and the view forming layer 9. The arrangement provides three views A, B and C each projected in different directions. Each pixel of the display panel 3 is driven with information for one specific view.

Figure 3:
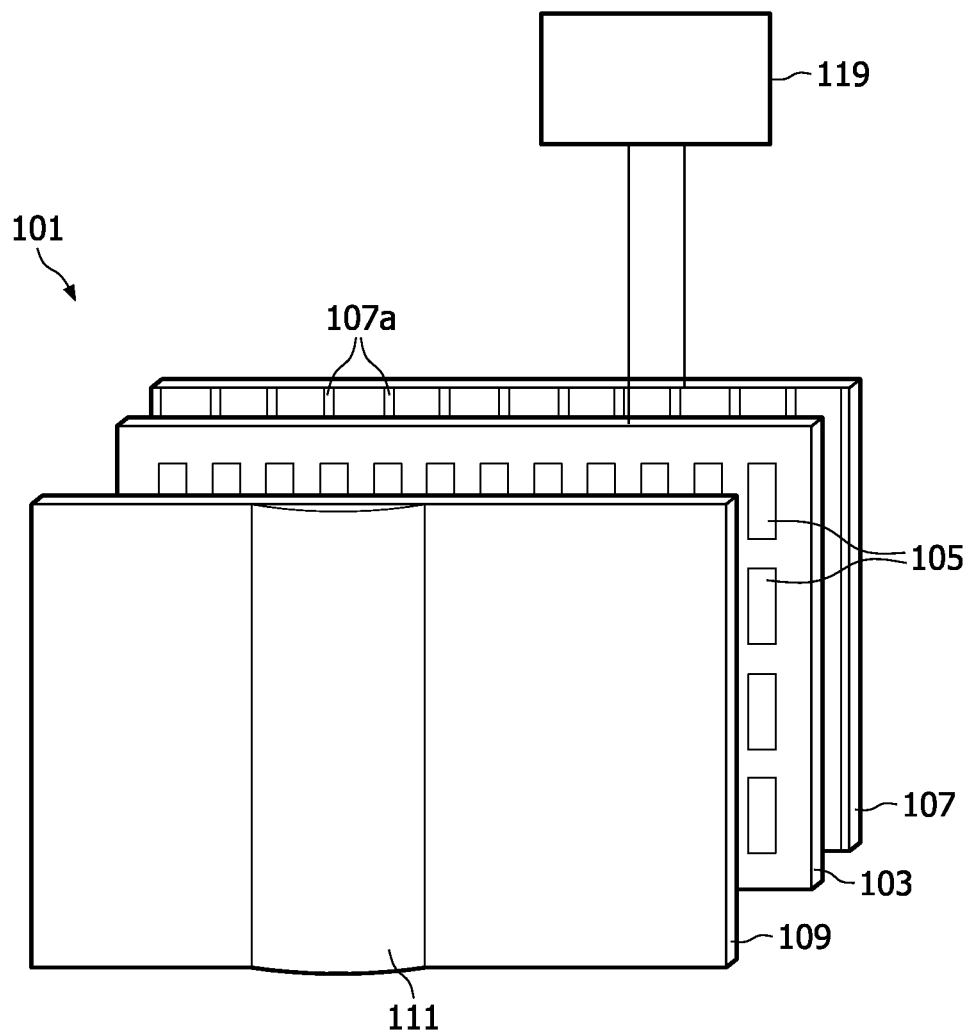
FIG. 3 is a schematic perspective view of an embodiment of an autostereoscopic display device according to the invention.

FIG. 3 is a schematic perspective view of a (multi-view) autostereoscopic display device 101 according to the invention. The device 101 is similar to the device 1 shown in FIGS. 1 and 2. In particular, the device 101 comprises a spatial light modulator in the form of a display panel 103 for performing a display forming function and a view forming layer 109 for performing a view forming function. These elements are generally the same as those described above with reference to FIG. 1. Note however, that the lenticules need not be cylindrical for the invention. In general any view forming element may be used as long as multiple views are provided.

The device 101 according to the invention comprises a backlight 107. This backlight 107 is not a diffuse planar backlight, but instead comprises a plurality of narrow backlight areas 107a separated from one another in the width direction of the device 101. For the sake of clarity, only a small number of the backlight areas 107a are shown in FIG. 3.

Each backlight area 107a has a linear shape and extends from a top edge to a bottom edge of the backlight 107, in a direction which is substantially parallel to the column direction of the display panel 103. In this embodiment, the distance between the backlight areas 107a is much greater than the width of the backlight areas 107a, which width is relatively small (the width of the backlight areas 107a in the Fig. is exaggerated for the sake of clarity). In the device 101 shown in FIG. 3, the backlight areas 107a are each defined by a plurality of linearly arranged light emitting diodes.

The backlight areas 107a are independently switchable to provide different spatial light distributions in different portions of the driving cycle of the device 101.

The device 101 shown in FIG. 3 also includes a display driver 119 for sequentially driving the display panel 103 with information for different pluralities of views, namely a first five views and a second five views. The display driver 119 also sequentially drives the switching of the backlight areas 107a to provide different the spatial light distributions, namely first and second light distributions.

Figure 4A:
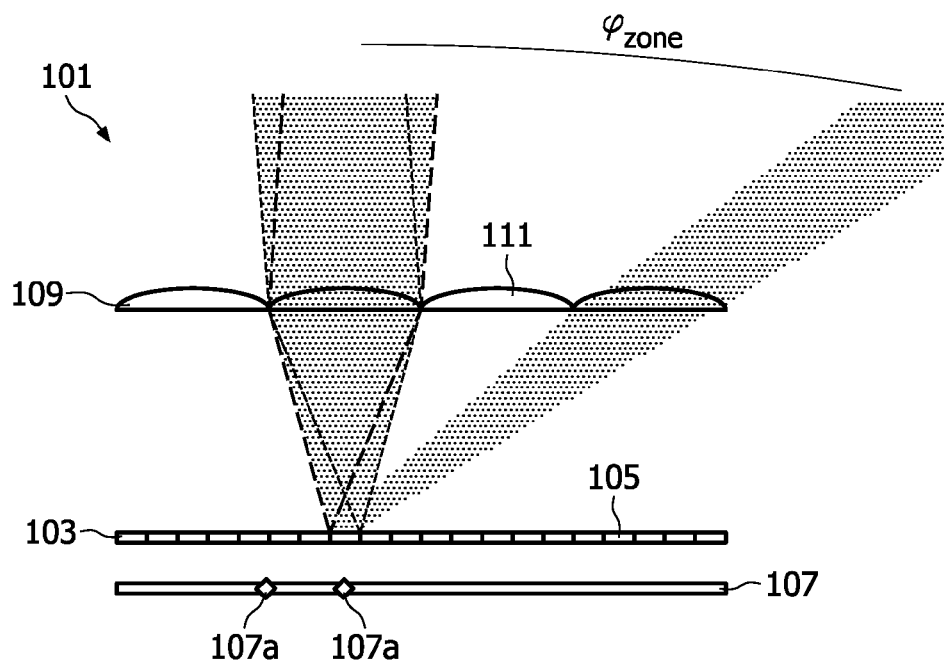
FIGS. 4a and 4b are schematic plan views showing the operation of the device shown in FIG. 3.
Figure 4B:
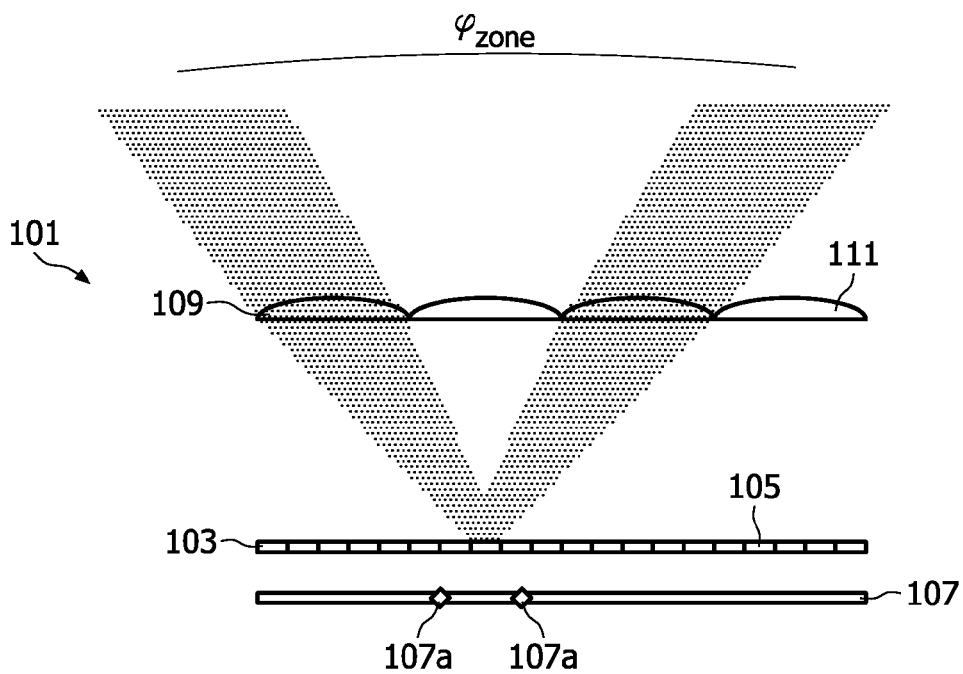

FIGS. 4a and 4b are schematic plan views showing the operation of the device shown in FIG. 3. FIG. 4a shows the device 101 in a first portion of a driving cycle and FIG. 4b shows the device 101 in a second portion of a driving cycle. The second portion immediately follows the first portion, and is itself immediately followed by a first portion of the subsequent driving cycle. For the sake of clarity, the distances between the backlight 107, the display panel 103 and the view forming layer 109 are not drawn to scale.

In the first portion of the driving cycle, as shown in FIG. 4a, a first plurality of the backlight areas 107a (only two of which are shown) are activated to provide a first spatial light distribution. In the device 101 shown, the first plurality of backlight areas 107a comprises alternate ones of the backlight areas 107a.

As shown in FIG. 4a, light from each of the activated backlight areas 107a is incident on each of the display pixels 105 of the display panel 103, and then on lenticular elements 111 of the view forming layer 109, in a specific angular range. For the sake of clarity, the figure only shows the light passing through one display pixel 105 from the two active backlight areas 107a.

At the same time as activating the first plurality of backlight areas 107a, the display driver 119 drives the display panel 103 with display information for a first five autostereoscopic views. The light from the activated backlight areas 107a is modulated by the display panel 103, and is then incident on the view forming layer 109 in the specific angular ranges. The view forming layer 109 projects the first five views in different horizontal directions which together define a first overall viewing angle. FIG. 4a only shows an element of one of the first five projected views (together with a repeated view to the right hand side).

The directions in which the first five views are projected by the view forming layer 109 are dependent on the angle with which the modulated light from the backlight areas 107a is incident. In the first portion of the driving cycle, it can be seen that the views will projected across a range of directions which are substantially centered on a direction perpendicular to the plane of the display device 101. As mentioned above, repeated views are also projected, an element of one of which is shown on the right hand side in FIG. 4a.

In the second portion of the driving cycle, as shown in FIG. 4b, a second plurality of the backlight areas 107a (only two of which are shown) are activated to provide a second spatial light distribution. In the device 101 shown, the second plurality of backlight areas 107a also comprises alternate ones of the backlight areas 107a, in this case positioned in between those which define the first plurality of backlight areas 107a.

As shown in FIG. 4b, light from each of the activated backlight areas 107a is again incident on each of the display pixels 105 of the display panel 103 and then on each of the lenticular elements 111 of the view forming layer 109 in a specific angular range. However, these incident angles differ from those in the first portion of the driving cycle.

At the same time as activating the second plurality of backlight areas 107a, the display driver 119 drives the display panel 103 with display information for a second five autostereoscopic views. The light from the activated backlight areas 107a is modulated by the display panel 103, and is then incident on the view forming layer 109 in the specific angular ranges. The view forming layer 109 projects the second five views in different horizontal directions which together define a second overall viewing angle. FIG. 4b only shows one of the second five projected views (together with a repeated view).

The directions in which the second five views are projected by the view forming layer 109 are dependent on the angle with which the modulated light from the backlight areas 107a is incident. The second five views are projected across a range of directions which are at angles of approximately 20° to the directions in which the first five views have been projected. As mentioned above, repeated views are also projected, one of which is shown in FIG. 4b.

Across the whole of the driving cycle, the display panel 103 is driven with and provides an output for ten different views. These views are projected in different directions, as shown in FIGS. 4a and 4b.

As will be appreciated by the skilled person, at any one time, information for only half of the ten views is being projected by the device 101. However, provided the frame rate of the device is sufficiently high, a user will not notice any screen flicker, whichever ones of the ten views are being observed.

The display panel 103 is a liquid crystal display device having a frame rate of 100 Hz or other frequency appropriate for driving. Such a frame rate may be achieved for example using the optically compensated birefringent (OCB) liquid crystal effect, details of which will be known to those skilled in the art.

It will also be appreciated that the use of the display panel 103 to sequentially output the information for different views causes there to be no reduction in the resolution of each view, as compared to a number of conventional techniques for increasing the number of views provided by an autostereoscopic display device.

Figure 5:
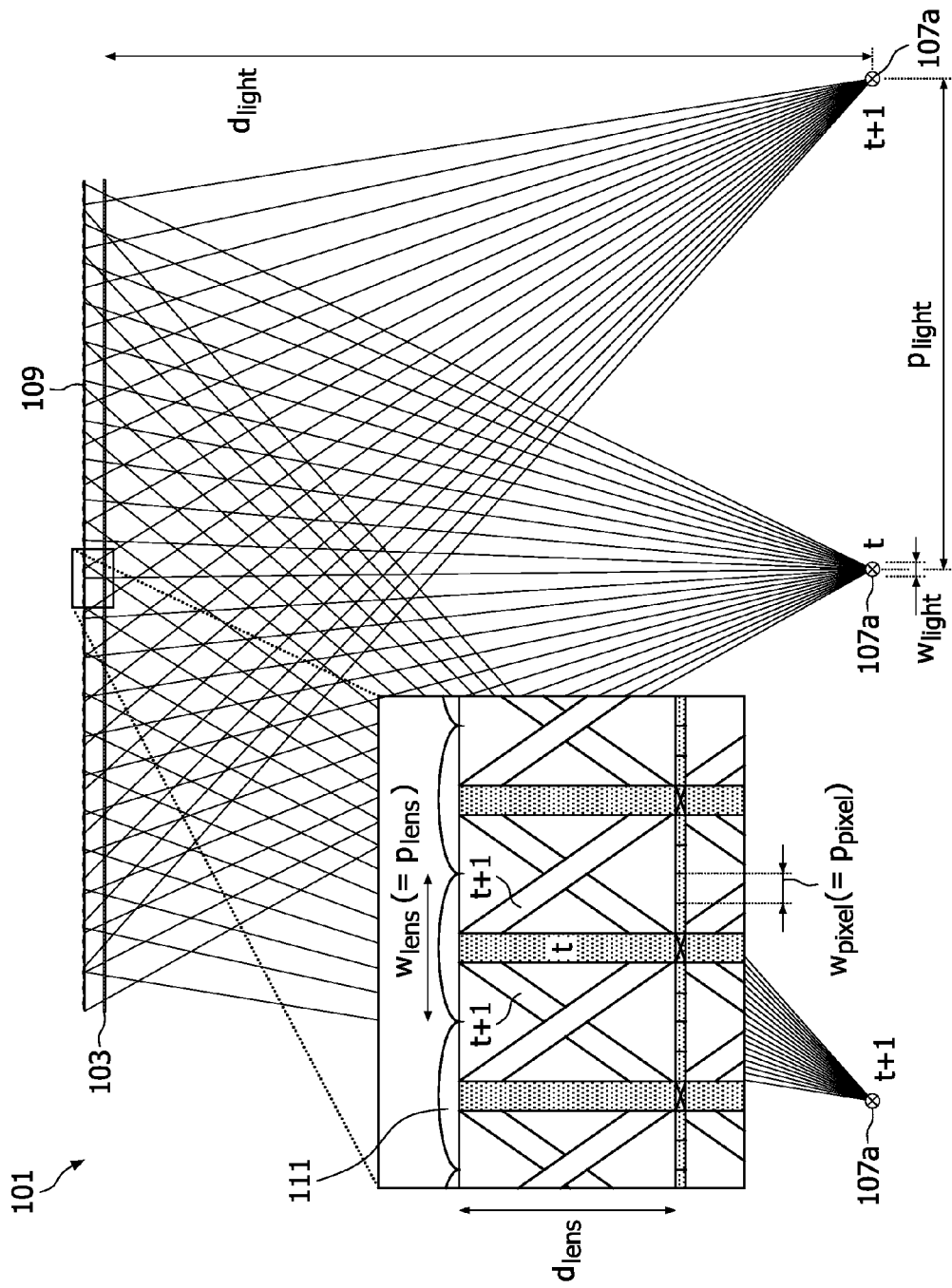
FIG. 5 is a more detailed schematic plan view showing the operation of the device shown in FIG. 3, and which includes an enlarged portion.

FIG. 5 is a more detailed schematic plan view of the device 101 shown in FIG. 3, which more accurately shows the relative arrangement of the elements of the device 101.

The Fig. includes an enlarged portion showing light passing through individual ones of the display pixels 105 of the display panel 103.

FIG. 5 shows three adjacent backlight areas 107a, the central one of which is activated in a first portion of the driving cycle (at time t) and the outer ones of which are activated in the second portion of the driving cycle (at time t+1). For the purposes of explanation, light rays from all three of the backlight areas 107a are shown.

As can be seen, light from each of the backlight areas 107a is incident on each of the display pixels 105 of the display panel 103, and then on lenticular elements 111 of the view forming layer 109, in a specific (and narrow) angular range. The distance between the planes of the backlight 107 and the display panel 103, $d_{light}$, is sufficiently large that the light rays incident on each display pixel 105 and lenticular element 111 from each backlight area 107a are substantially parallel.

With specific reference to the enlarged portion of FIG. 5, it can be seen that light rays from the centrally positioned backlight area 107a in the first portion of the driving cycle (at time t) and light rays from the outer backlight areas 107a in the second portion of the driving cycle (at time t+1) are incident on each of the lenticular elements 111 of the view forming layer 109 with different angles. The views formed by the view forming layer 109 in the different portions of the driving cycle are therefore projected in respective different directions.

For the device 101 shown in the Figs., the individual viewing angle $\phi_{view}$ of each view is given by the following equation:

$$\tan\varphi_{view} = \frac{p_{pixel}}{d_{lens}} \quad (1)$$

where $p_{pixel}$ is the pitch between the display pixels 105 of the display panel 103 and $d_{lens}$ is the distance between the planes of the display panel 103 and the view forming layer 109. The combined viewing angle $\phi_{zone}$ of the five views projected in each of the portions of the driving cycle is then given by the following equation:

$$\tan\varphi_{zone} = N\tan\varphi_{view} = \frac{Np_{pixel}}{d_{lens}} \sim \frac{w_{lens}}{d_{lens}} \quad (2)$$

where N is the number of views, which is five in this case, and $w_{lens}$ is the width of each lenticular element 111 of the view forming layer 109.

The above approximation applies to most display devices according to the invention, provided the width of the lenticular elements 111 is similar to N times the display pixel width.

For effective operation of the device 101 according to the invention, the backlight 107 should be configured to comply with the following requirements:

$$\frac{w_{light}}{p_{light}} \le \tan\varphi_{view} \quad (3)$$

$$\frac{w_{light}}{d_{light}} \le \tan\varphi_{view} \quad (4)$$

where $w_{light}$ is the width of each backlight area 107a, $p_{light}$ is the pitch between backlight areas 107a, and $d_{light}$ is the distance between the planes of the backlight 107 and the display panel 103.

The above requirements ensure that light incident on each display pixel 105 of the display panel 103 from each backlight area 107a is substantially parallel, and that light incident from adjacent backlight areas (activated in different portions of the driving cycle) is incident with appropriately different angles to ensure that the respective pluralities of autostereoscopic views are projected in different directions.

As described above, the first five views and the second five views projected by the device 101 together provide ten autostereoscopic views each separated by small angles. It is preferable that cross-talk between the adjacent outer views of the first and second five views be minimized, since these views are substantially at the centre of the useful viewing angle of the device 101, i.e. views five and six of the ten views.

Cross-talk between the adjacent views of the first and second five views is typically caused by light from display pixels 105 of the display panel 103 being incident on the boundary between two adjacent lenticular elements 111 of the view forming layer 109.

For example, the enlarged portion of FIG. 5 shows that, at time t, light passes through the central display pixel 105 of the display panel 103 normally, and targets the middle portion of the adjacent lenticular element 111 of the view forming layer 109. Several lenticular elements 111 to either side, the light from this central display pixel 105 (from other backlight areas 107a) targets the view forming layer 109 on the boundary between two adjacent lenticular elements 111. This targeting of the boundary between lenticular elements 111 causes cross talk.

The cross-talk described above is minimized or eliminated by configuring the backlight 107 and the display panel 103 to comply with the following requirement:

$$\frac{p_{light}}{d_{light}} \le \tan\varphi_{zone} \quad (5)$$

For example, the backlight 107 and the display panel 103 may conveniently be configured to comply with the following requirement:

$$\frac{p_{light}}{d_{light}} = \frac{N-1}{N}\tan\varphi_{zone} \quad (6)$$

In this way, it can be ensured that light passing through a display pixel 105 (from different backlight areas 107a) targets different lenticular elements 111. That is to say, when light from a display pixel 105 (and a backlight area 107a) is incident on the boundary between two adjacent lenticular elements 111, there will also be light from the same display pixel 105 (but different backlight areas 107a) which wholly targets each of the adjacent lenticular elements 111.

Figure 6:
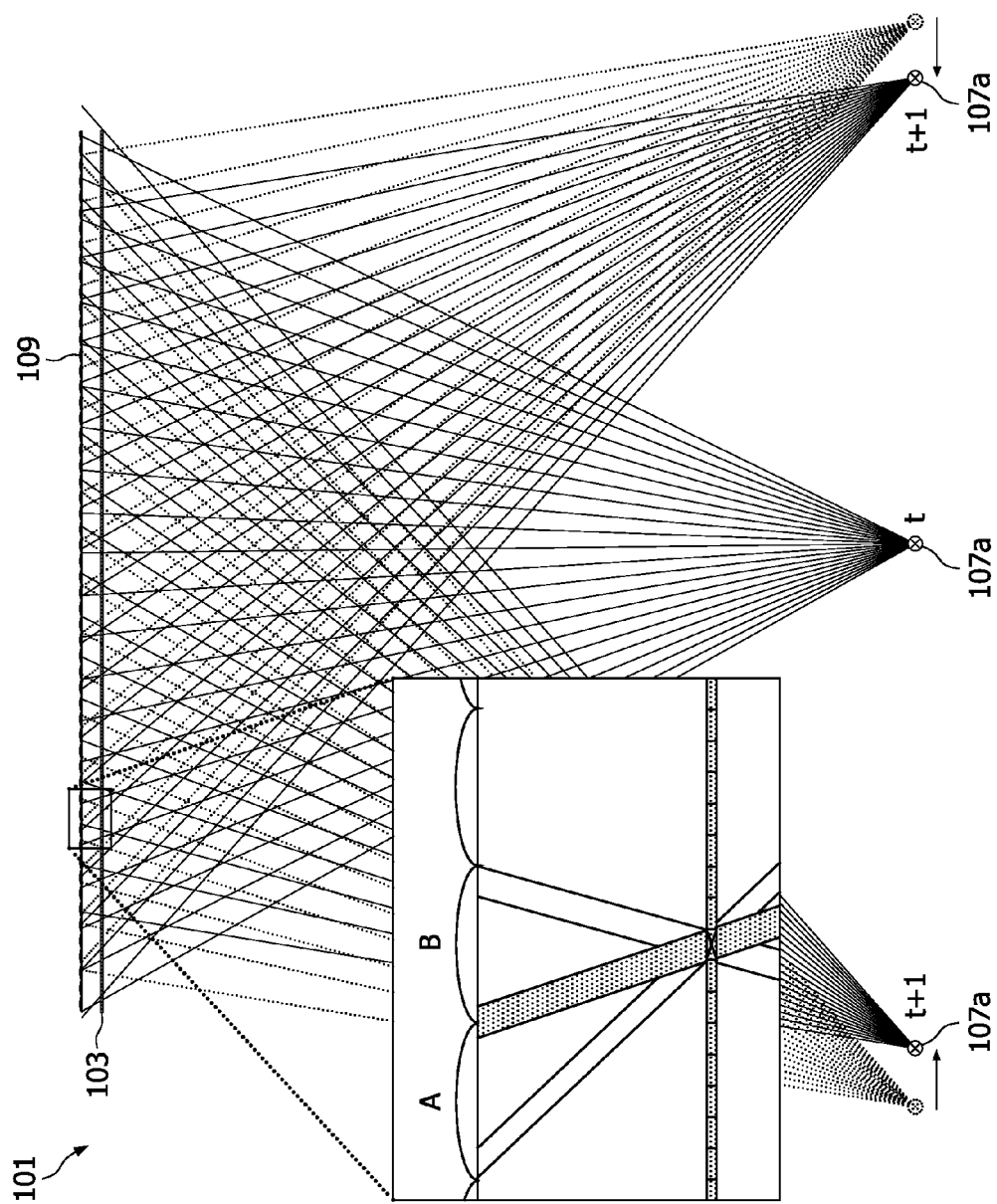
FIG. 6 is a view similar to that of FIG. 5, for use in explaining how cross-talk between views may be eliminated or minimized.

The effect of configuring the display device 101 in this way is shown in FIG. 6. In particular, FIG. 6 shows the effect of reducing $p_{light}$ such that the display device 101 complies with equation (6) above. The enlarged portion of the Fig. shows light passing through a display pixel 105 from different backlight areas 107a, with light from at least one backlight area 107a wholly targeting each lenticular elements 111.

The asymmetry caused by configuring the display device 101 to comply with equation (6) as shown in FIG. 6 may result in moiré patterns. However, these patterns, if they occur, can be prevented, or cancelled, by adjusting the light intensities of the display pixels 105 of the display panel 103.

Figure 7A:
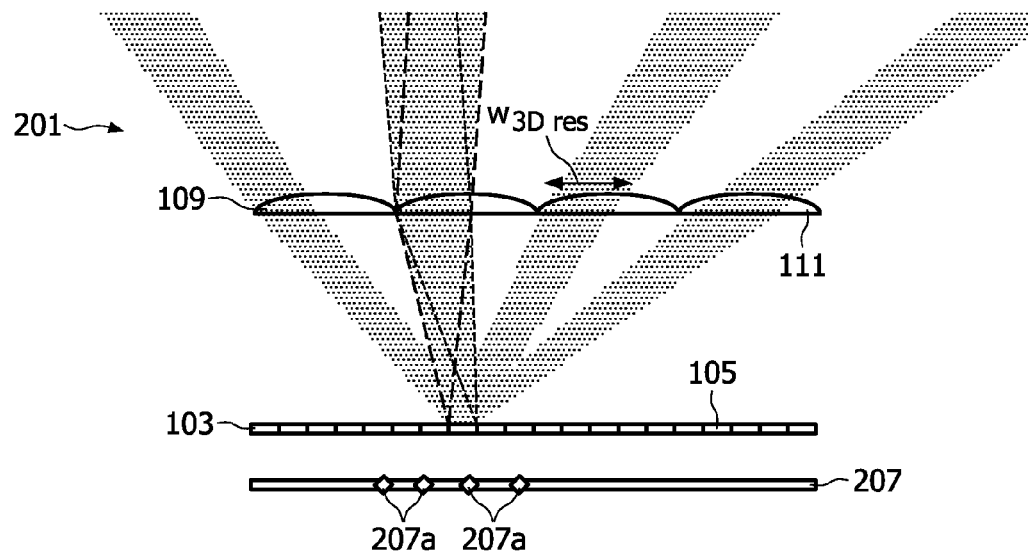
FIGS. 7a and 7b are schematic plan views showing the operation of another autostereoscopic display device according to the invention.
Figure 7B:
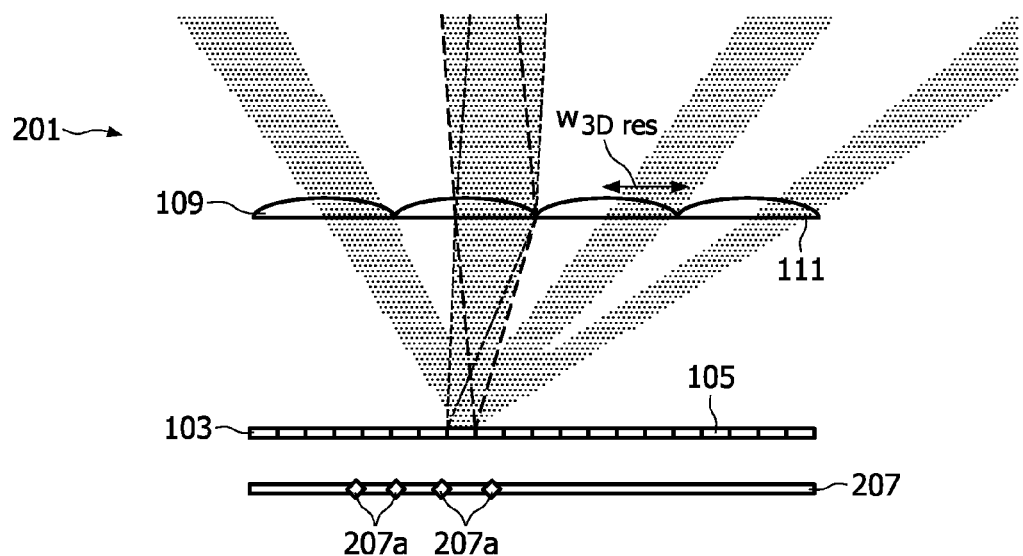

FIGS. 7a and 7b are schematic plan views showing the operation of another multi-view autostereoscopic display device 201 according to the invention. Instead of an increase in the number of autostereoscopic views, this device 201 is configured to provide an effective increase in the perceived resolution of each view.

The display device 201 shown in FIGS. 7a and 7b is similar to the device 101 described above, and like reference numerals are used to indicate like structure. The display device 201 shown in FIGS. 7a and 7b only differs from the device 101 described above in the arrangement of the backlight areas 207a and the driving scheme employed by the display driver (not shown).

FIG. 7a shows the device 201 in a first portion of a driving cycle and FIG. 7b shows the device 201 in a second portion of a driving cycle. The second portion immediately follows the first portion, and is itself immediately followed by a first portion of the subsequent driving cycle. For the sake of clarity, the distances between the backlight 207, the display panel 103 and the view forming layer 109 are not drawn to scale.

In the first portion of the driving cycle, as shown in FIG. 7a, a first plurality of the backlight areas 207a (only four of which are shown) are activated to provide a first spatial light distribution. In the device 201 shown, the first plurality of backlight areas 207a comprises alternate ones of the backlight areas 207a.

As shown in FIG. 7a, light from each of the activated backlight areas 207a is incident on each of the display pixels 105 of the display panel 103, and then on a left hand portion of each of the lenticular elements 111 of the view forming layer 109, in a specific angular range. For the sake of clarity, the Fig. only shows the light passing through one display pixel 105 from the four active backlight areas 207a.

At the same time as activating the first plurality of backlight areas 207a, the display driver drives the display panel 103 with display information for alternate columns of elements for five autostereoscopic views. The light from the activated backlight areas 207a is modulated by the display panel 103, and is then incident on the view forming layer 109 in the specific angular ranges. The view forming layer 109 projects the elements of the five views in different horizontal directions which together define an overall viewing angle. FIG. 7a only shows an element of one of the five projected views (together with repeated views on either side).

The directions in which the five views are projected by the view forming layer 109 are dependent on the angle with which the modulated light from the backlight areas 207a is incident. In the first portion of the driving cycle, it can be seen that the views will projected across a range of directions which are substantially centered on a direction perpendicular to the plane of the display device 201. As mentioned above, repeated views are also projected.

In the second portion of the driving cycle, as shown in FIG. 7b, a second plurality of the backlight areas 207a (only four of which are shown) are activated to provide a second spatial light distribution. In the device 201 shown, the second plurality of backlight areas 207a also comprises alternate ones of the backlight areas 207a, in this case positioned in between those which define the first plurality of backlight areas 207a.

As shown in FIG. 7b, light from each of the activated backlight areas 207a is again incident on each of the display pixels 105 of the display panel 103 and then on a right hand portion of each of the lenticular elements 111 of the view forming layer 109 in a specific angular range. These incident angles differ from those in the first portion of the driving cycle, but define the same angle to the normal as those in the first portion of the driving cycle (the incident angles in the first and second portions of the driving cycle are symmetrical about the normal).

At the same time as activating the second plurality of backlight areas 207a, the display driver drives the display panel 103 with display information for alternate columns of elements for the five autostereoscopic views, which columns are those in between the ones with which the display panel 103 was driven in the first portion of the driving cycle. The light from the activated backlight areas 207a is modulated by the display panel 103, and is then incident on the view forming layer 109 in the specific angular ranges. The view forming layer 109 projects the elements of the five views in different horizontal directions which together define the same overall viewing angle as that defined in the first portion of the driving cycle. FIG. 4b only shows one of the five projected views (together with a repeated view).

The directions in which the elements of the five views are projected by the view forming layer 109 in each portion of the driving cycle are dependent on the angle with which the modulated light from the backlight areas 107a is incident. However, the views are effectively projected in the same direction in each portion of the driving cycle because the incident angles are symmetrical about the normal direction. The difference between the first and second portions of the driving cycle is that the elements of the five views are projected from different portions of the lenticular elements 111 (left and right hand portions respectively).

Thus, across the whole of the driving cycle, the display panel 103 is driven with and provides an output for all of the elements of five different views. These views are projected in the same directions, as shown in FIGS. 7a and 7b, and their effective resolution is doubled.

As will be appreciated by the skilled person, at any one time, information for only half of each of the five views is being projected by the device 201. However, provided the frame rate of the device is sufficiently high, a user will not notice any screen flicker, whichever ones of the ten views are being observed.

As shown in FIG. 5, the necessary backlight areas 107a for forming a working embodiment of the invention are provided at a distance $d_{light}$ from the plane of the display panel 103 and at a pitch of $p_{light}$. The positioning of these backlight areas 107a results in a display device 101 having a significantly greater thickness that other known display devices, because of the need to space the backlight 107 from the display panel 103.

In practice, the backlight 107 shown in FIG. 5 may be replaced with a different backlight assembly positioned much closer to the plane of the display device 103. A suitable backlight assembly 307 for reducing $d_{light}$, and thereby reducing the overall thickness of the display device, is illustrated in FIG. 8.

Figure 8:
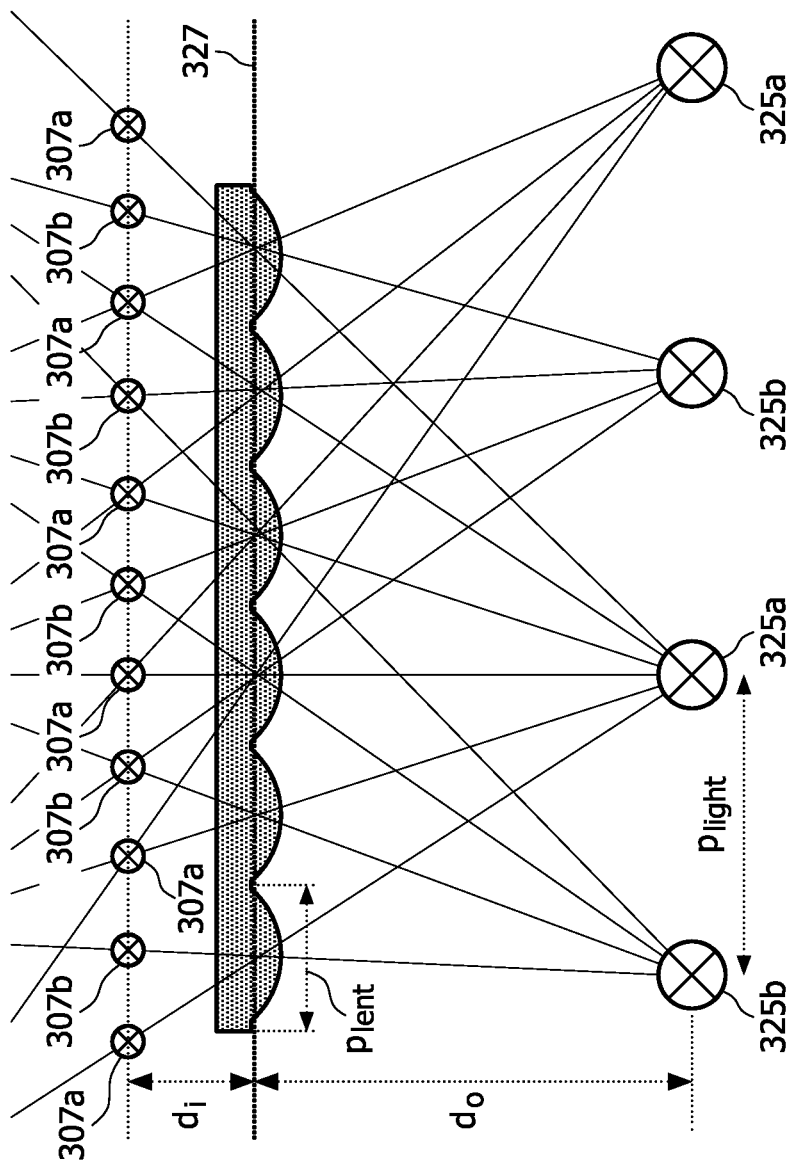
FIG. 8 is a view for use in explaining how the thickness of an autostereoscopic display device according to the invention can be reduced.

The backlight assembly 307 in FIG. 8 comprises plurality of (real) backlight areas 325a, 325b and an array of lenticular lenses 327. The backlight areas 325a, 325b are provided at a distance $d_o$ from the plane of the array of lenticular lenses 327 and the lenticular lenses have a pitch of $p_{light}$. The array of lenticular lenses 327 is similar to that used as a view forming means in the above described display devices 101, 201, but the lenticular lenses have a pitch of $p_{lent}$ and a focal length of $f_{lent}$.

The backlight areas 325a, 325b and the array of lenticular lenses 327 together define a plurality of virtual backlight areas 307a, 307b. These virtual backlight areas 307a, 307b are defined at a distance $d_i$ from the plane of the array of view forming elements 327, which distance is smaller than $d_o$. It is these virtual backlight areas which are employed as the backlight areas in the devices 101, 201 described above.

The arrangement of the backlight areas 325a, 325b and the virtual backlight areas 307a, 307b are such that the virtual backlight areas 307a for the first portions of the driving cycles are defined by backlight areas 325a, and virtual backlight areas 307b for the second portions of the driving cycles are defined by backlight areas 325b.

For this to be the case, the arrangement must comply with the following requirements:

$$p_{lent} = 2\frac{d_i}{d_o + d_i} \cdot p_{light} \quad (7)$$

$$f_{lent} = \frac{d_o d_i}{d_o + d_i} \quad (8)$$

The objective is then to reduce the overall thickness of the display device. This can be achieved by spacing the backlight assembly 307 (and more specifically the virtual backlight areas 325a, 325b) from the display panel 103 by a distance $d'_{light}$, which distance is significantly less than the corresponding distance $d_{light}$ in the above described devices 107, 207. This reduction in spacing is facilitated by the use of the virtual backlight areas 307a, 307b, which have a very small width and a very small pitch.

The thickness of the device may be represented by the following equation:

$$d_{overall} = d_i + d_o + d'_{light} \quad (9)$$

where $d_{overall}$ is the overall thickness of the device (excluding the view forming means).

The following relationship between $d_{light}$, as used with the backlights 107, 207 of the devices 107, 207 described above, and $d'_{light}$, as used when the backlights 107, 207 are substituted for the backlight assembly 307 shown in FIG. 8, can be derived:

$$\begin{bmatrix} p'_{light} \\ w'_{light} \\ d'_{light} \end{bmatrix} = \frac{d_i}{d_o} \begin{bmatrix} p_{light} \\ w_{light} \\ d_{light} \end{bmatrix} \qquad (10)$$

where $p_{light}$, $w_{light}$, and $d_{light}$ are parameters of the virtual backlight areas 307a, 307b and $p_{light}'$, $w_{light}'$, and $d_{light}'$ are parameters of the backlight areas 325a, 325b.

Thus, when the backlight arrangement 307 shown in FIG. 8 is employed, all backlight properties are scaled by $d_i/d_o$.

The requirements of equations (3) to (6) above involve only ratios of $p_{light}$, $w_{light}$, and $d_{light}$, which remain valid. Thus, we find:

$$d_{overall} = d_i + d_o + \frac{d_i}{d_o} d_{light} \qquad (11)$$

From here, it is possible to select a value for $d_i/d_o$ which is smaller than 1. The "overhead" $d_i+d_o$ may be made insignificant by selecting values for both $d_i$ and $d_o$ which are substantially smaller than the original $d_{light}$.

Preferred embodiments of the invention have been described above.

It will be understood by those skilled in the art that the above-mentioned embodiments illustrate rather than limit the invention and that various changes and modifications may be made without departing from the scope of the invention.

For example, the shape of the lenses need not be cylindrical, i.e. other embodiments may use shapes according to need as long as they provide at least the multiple views as explained below, For example, the embodiment described above employs a lenticular sheet as a view forming layer. However, another view forming layer may be used, such as a barrier layer having an array of transmissive slits.

The image forming means in the embodiment described above is a liquid crystal display panel. However, other forms of image forming means may be employed.

Furthermore, the effect of the invention has been described with regard to view formation in one direction, i.e. the width direction of a display. It will however be understood that multiple views may alternatively or additionally be created in the height direction using the invention. This could for example mean that the view forming means comprise a grid of view forming elements that provide the views in the height direction, or in both the width and height direction.

The embodiments described above involve driving cycles consisting of two portions. However, in other embodiments, the driving cycles may comprise three or more portions. The additional portions may be used to further increase the overall viewing angle or effective three dimensional resolution of the device.

Summarizing there is provided a multi-view autostereoscopic display device comprises: a backlight having a plurality of backlight areas arranged in a width direction of the display device; a spatial light modulator arranged over and in registration with the backlight, the spatial light modulator having an array of display forming elements arranged in rows and columns for modulating light received from the backlight; and a view forming layer arranged over and in registration with the spatial light modulator, the view forming layer having a plurality of view forming elements arranged in the width direction of the display device, each view forming element being configured to focus modulated light from adjacent groups of the display forming elements into a plurality of views for projection towards a user in different directions. The backlight is switchable to activate different ones of the backlight areas in different portions of a driving cycle of the display device so that, in the different portions of the driving cycle, modulated light from the active backlight areas is incident on each view forming element with respective different angles of incidence. In this way, the overall viewing angle or the effective three dimensional display resolution may be increased.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that the combination of these measures cannot be used to advantage.

The invention claimed is:

1. An autostereoscopic display device having a width direction and comprising:
    a backlight having top and bottom edges and a plurality of backlight areas arranged separately in a width direction;
    a spatial light modulator arranged over and in registration with the backlight;
    an array of display forming elements arranged on the spatial light modulator in rows and columns for modulating light received from the backlight;
    a view forming layer arranged over and in registration with the spatial light modulator; and
    a plurality of view forming elements arranged on the view forming layer in the width direction, each view forming element is configured to receive and direct modulated light from at least two of the display forming elements into a plurality of views towards a user,
    wherein different of the plurality of backlight areas are activated by switching the backlight during different portions of a driving cycle of the display device to enable modulated light from the active backlight areas to be incident on each view forming element with respective different angles of incidence during the different portions of the driving cycle.

2. The autostereoscopic display device according to claim 1 wherein the plurality of backlight areas define a plurality of spaced apart parallel bands, a length direction of the bands extending from the top edge to the bottom edge of the backlight.

3. The autostereoscopic display device according to claim 1, wherein the backlight comprises an opaque mask that is patterned with transmissive areas that provide the plurality of backlight areas.

4. The autostereoscopic display device according to claim 1, wherein, in the different portions of the driving cycle, light incident on each display forming element from a closest active backlight area of the plurality of backlight areas is projected towards different of the plurality of view forming elements.

5. The autostereoscopic display device according to claim 4, further comprising a display driver arranged to drive the backlight and the spatial light modulator wherein the display driver is arranged to, in the different portions of the driving cycle, drive the spatial light modulator with information for different pluralities of views, to thereby increase the effective number of views provided by the display device.

6. The autostereoscopic display device according to claim 1, wherein, in the different portions of the driving cycle, light incident on each display forming element from a closest active backlight area of the plurality of backlight areas is projected towards different portions of the same view forming element.

7. The autostereoscopic display device according to claim 6, further comprising a display driver arranged to drive the backlight and the spatial light modulator wherein the display driver is arranged to, in the different portions of the driving cycle, drive the spatial light modulator with information for different elements of a same plurality of views, to thereby increase the effective resolution of each of the views provided by the display device.

8. A method of driving a multi-view autostereoscopic display device, the method comprising acts of:
  providing a device having a width direction and including
    a backlight having top and bottom edges and a plurality of backlight areas arranged separately in a width direction,
    a spatial light modulator arranged over and in registration with the backlight,
    an array of display forming elements arranged on the spatial light modulator in rows and columns for modulating light received from the backlight,
    a view forming layer arranged over and in registration with the spatial light modulator, and
    a plurality of view forming elements arranged on the view forming layer in the width direction, each view forming element is configured to receive and direct modulated light from at least two of the display forming elements into a plurality of views towards a user;
  switching the plurality of backlight areas to provide first and second spatial light distribution and simultaneously driving the spatial light modulator with information for a respective plurality of views for the first and second spatial light distribution,
  wherein the first spatial light distribution and its plurality of views is switched in a first portion of the driving cycle, and is different from the second spatial light distribution and its plurality of views that is switched in a second portion of the driving cycle.

9. The method of driving a multi-view autostereoscopic display device as claimed in claim 8, wherein the first and second pluralities of views are provided respectively by first and second pluralities of view forming elements.

10. The method of driving a multi-view autostereoscopic display device as claimed in claim 8, wherein the method is stored on a computer program product for enabling a programmable device processing the computer program product to carry out the method acts.

* * * * *